United States Patent [19]
Anderson et al.

[11] Patent Number: 4,593,334
[45] Date of Patent: Jun. 3, 1986

[54] THIN FILM TRANSDUCER

[75] Inventors: Nathaniel C. Anderson, Pine Island; Larry E. Daby, Rochester; Gene A. Johnson, Rochester; Patrick M. McCaffrey, Rochester, all of Minn.

[73] Assignee: International Business Machines Corporation, Armonk, N.Y.

[21] Appl. No.: 490,631

[22] Filed: May 2, 1983

[51] Int. Cl.$^4$ .................................. G11B 5/12
[52] U.S. Cl. ..................... 360/126; 360/123; 360/125
[58] Field of Search ............... 360/125, 122-123, 360/119-120, 126-127

[56] References Cited

U.S. PATENT DOCUMENTS

| | | |
|---|---|---|
| 4,190,872 | 2/1980 | Jones, Jr. et al. ............ 360/125 |
| 4,219,854 | 8/1980 | Church et al. ............... 360/123 |
| 4,423,451 | 12/1983 | Chi .......................... 360/125 |

Primary Examiner—A. J. Heinz
Assistant Examiner—David J. Severin
Attorney, Agent, or Firm—Robert W. Lahtinen

[57] ABSTRACT

A film transducer head design is formed on a substrate where the first yoke layer and electric terminal strip that connects the coil center pad to the head exterior are formed at the same time followed by successive layers that form the transducer gap, coil insulation, coil, coil insulation and the second yoke layer. This sequence allows the coil to be tested immediately after deposition of the coil material and at a time in the fabrication sequence when it can be reworked or replaced if a discontinuity (open) or shorted turn(s) is (are) identified.

2 Claims, 2 Drawing Figures

THIN FILM TRANSDUCER

BACKGROUND OF THE INVENTION

This invention pertains to film type magnetic transducer heads and more particularly to an improved transducer structure that enables intermediate testing.

In current film type transducer head designs, two layers of magnetic material are deposited on a substrate with an insulating layer separating the magnetically permeable layers except at a back gap to form a yoke with a closed magnetic path extending from the transducer gap at the pole tip portions. A substantially flat, modified spiral coil extends through the insulating material which separates the yoke layers and also isolates the coil convolution from the layers forming the yoke. The center pad of the coil is electrically connected by a jumper that is formed with the second layer of the yoke material. Thin film magnetic heads of this design are shown in U.S. Pat. No. 4,190,872 and 4,219,854. This design functions well, but is subject to some fabrication limitations that tend to compromise the yield of devices from the fabrication process. Principally, the device cannot be tested until the second permalloy layer is applied, at which time the testing becomes more complex, and the opportunity to rework failing coils no longer exists. The most difficult test is for shorted turns whereby the winding is effectively reduced by one convolution; that is an eight turn coil has become a seven turn coil. As the number of turns increases this problem will become progressively more difficult to detect. If it were possible to test the coil immediately after the conductor turns have been deposited and isolated, the procedure could be simplified, and it would also be possible to rework most of devices to full specification requirements rather than discarding the transducer that is then almost fully processed.

SUMMARY OF THE INVENTION

The modified structure of the present invention causes the coil termination to be fabricated prior to the application of the coil winding material. When the coil forming conductive copper material is applied, the continuity and coil convolution separation can immediately be tested. Testing at this stage of fabrication makes it easier to identify single shorted turns and also enables defects to be identified when it is possible to rework or replace the coil and thereby enhance the yield of good devices from the process. At this stage of fabrication a selective etchant may be applied that removes the copper conductor coils without damage to the underlying insulation or permalloy elements. This enables the conductive coating, masking, copper electroplating and mask removal to be repeated to create a winding that meets device specifications without compromising prior process steps or requiring the discarding of a completed device that does not have other defects.

DETAILED DESCRIPTION

Figure 2:
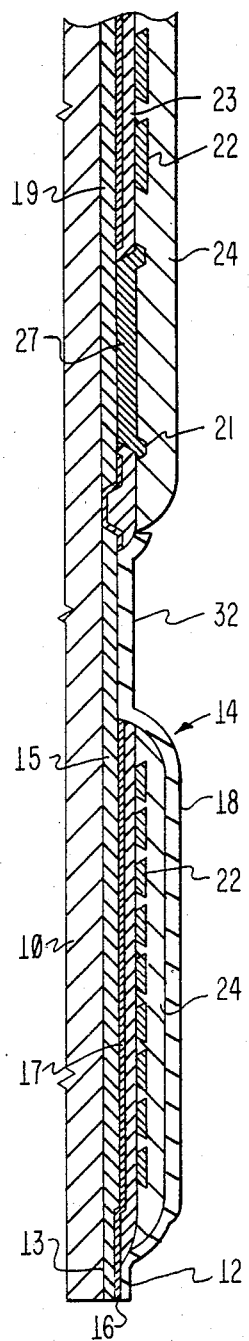
FIG. 2 is a further enlarged partial sectional view taken along line 2—2 of FIG. 1.
Figure 1:
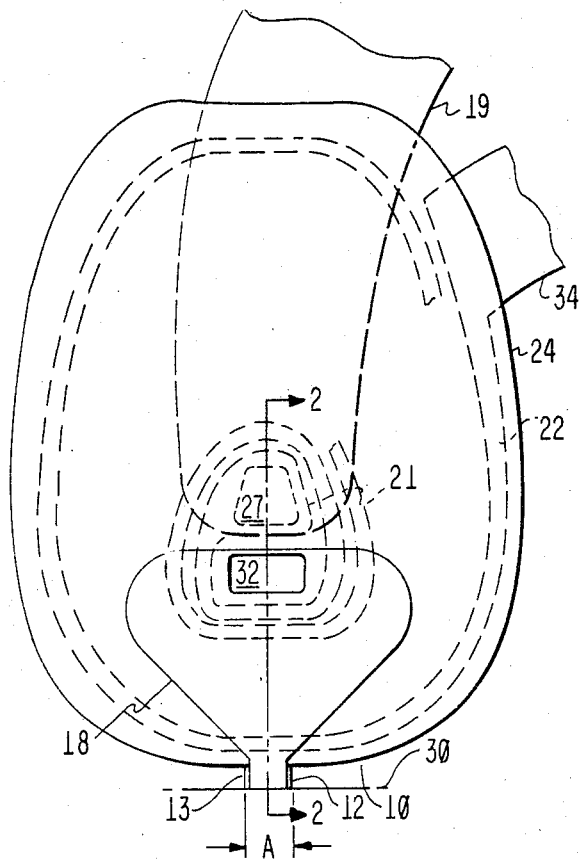
FIG. 1 is an enlarged plan view of a film transducer incorporating the invention.

As shown in FIGS. 1 and 2, a thin film (transducer) head is formed on a ceramic substrate 10. A pair of permalloy pole pieces 12 and 13 form a yoke 14 with a back gap region 32 where the yoke members contact one another and a transducer gap 16 defined by the thickness of the gap material 17. The electrical terminal 19 is formed on the substrate 10. A continuous coil, copper winding 22 extends through the yoke 14 and over the terminal strip 19 being separated from the yoke by the insulating layers 23 and 24 and from the terminal strip 19 by the insulating layer 23 except in the electrical contact region 27. The convolutions of winding 22 extend from the enlarged terminal strip 19 to the enlarged central terminal end pad 21. Although FIG. 1 is shown enlarged, it will be appreciated that the dimension A in the pole tip region is typically less than a thousandth of an inch and the other dimensions of the transducer head assembly are in practice correspondingly smaller than the enlarged dimensions of the illustration.

The transducer head is formed on the non-magnetic ceramic support 10 which in the usual embodiment is the trailing edge and rear air bearing surface 30 of a slider element. The initial layer is a permalloy material that is applied to limited areas to form the yoke layer, which includes pole tip portion 13 and back region 15 and the terminal 19. The yoke layer, including back region 15 and pole tip 13 underlies the upper yoke layer, which includes back region 18 and pole tip 12 and has the same shape and dimensions as such upper yoke layer 14 except for the somewhat increased width of the pole tip region adjacent the air bearing surface 30. The transducer gap 16 is established by a thin layer 17 of non-conductive, non-magnetic material which overlies the entire transducer surface with the exception of the electrical contact area 27 and the yoke back gap 32 with the thickness controlled to establish the proper transducer gap dimension between pole tip regions of the yoke portions 12 and 13. The first insulation layer 23 is then applied which electrically isolates the coil 22 from the yoke back region layer 15 and the terminal strip 19 except in the yoke back gap region 32 and the electrical contact area 27. The insulation 23 is also excluded from the pole tip region 13. The transducer assembly as partially fabricated has a metal coating applied to the surface sufficient to make the surface conductive, is then masked using photoresist techniques to define the configuration of the coil 22 and the conductive layer that forms the continuous coil 22 as applied by electroplating copper on the exposed unmasked areas. The mask and underlying metal coating is thereupon removed. The coil 22 should form continuous convolutions from the electrical contact area 27 to the enlarged terminal surface 34 without electrical interruption or shorting between convolutions that would electrically reduce the number of turns in the coil.

At this stage of fabrication the coil 22 is testable using the terminal strip 19 and the enlarged electrical contact area 34 at the end of the coil. At this time it is possible to rework defective coils using a selective etchant which dissolves only the copper coil layer 22, 34 without damaging the permalloy pole piece 13, gap materials 17 or insulation 23. An etchant that provides this function is a 20 percent solution of ammonium persulfate having a pH of 8. After removing the defective copper layer the surface can be remetalized with copper, masked with photoresist material, exposed, developed and plated with copper to reestablish the coil convolutions and extended surface electrical contact area 34.

Following the intermediate electrical testing and any necessary reworking, the remaining fabrication steps occur. The insulation layer 24 is applied followed by the final permalloy yoke layer 12, 18.

While the invention has been particularly shown and described with reference to a preferred embodiment thereof, it will be understood by those skilled in the art that various changes in form and details may be made therein without departing from the spirit and scope of the invention.

What is claimed is:

1. A thin film transducer for recording and reading magnetic transitions on a magnetic recording medium, said transducer comprising:

two layers of magnetic material deposited on a substrate and forming a yoke structure comprising a pole tip region and a back gap region;

non-magnetic material deposited between said two layers except at a back gap region, said non-magnetic material forming a transducer gap at the pole tip region;

a flat conductor coil including a plurality of deposited substantially helical turns, at least respective one portions of which are disposed between the two layers of the yoke structure, with a helical coil terminal end within the helical turns;

a conductor member substantially coplanar with the first deposited of said yoke layers and in electrical contact with said helical coil terminal end within the helical turns, extending to a location beyond the periphery of said flat conductor coil and disposed between respective second portions of said flat conductor coil helical turns and said substrate; and insulating material electrically insulating said conductor coil from said yoke structure and said flat conductor coil helical turns from said conductor member; wherein said first deposited of said layers and said conductor member are formed simultaneously of a common material.

2. A thin film transducer head mounted on a substrate which includes a yoke comprising first and second layers extending from a pole tip transducing gap to a back region including a back gap at which at which said yoke layers are in intimate contact;

a coil extending through and electrically insulated from said yoke intermediate said transducing gap and said back gap and having an inner terminal end;

an electric terminal strip substantially coplanar with said first yoke layer and isolated therefrom;

said electric terminal strip electrically connected to said coil inner terminal end, extending between said coil and said substrate to a location beyond the periphery of said coil and electrically insulated from the overlying convolutions of said coil wherein said first yoke layer and said electric terminal strip are formed simultaneously of a common material.

* * * * *